United States Patent [19]

Angevine et al.

[11] Patent Number: 4,612,108

[45] Date of Patent: Sep. 16, 1986

[54] HYDROCRACKING PROCESS USING ZEOLITE BETA

[75] Inventors: Philip J. Angevine, West Deptford; Kenneth M. Mitchell, Mt. Laurel; Stephen M. Oleck, Morristown; Stuart S. Shih, Cherry Hill, all of N.J.

[73] Assignee: Mobil Oil Corporation, New York, N.Y.

[21] Appl. No.: 762,187

[22] Filed: Aug. 5, 1985

[51] Int. Cl.$^4$ ............................................. C10G 47/16
[52] U.S. Cl. ........................... 208/111; 208/120; 208/59
[58] Field of Search ............... 208/59, 58, 111, 89, 208/120, 57, 109

[56] References Cited

U.S. PATENT DOCUMENTS

| | | | |
|---|---|---|---|
| 3,558,471 | 1/1971 | Kittrell | 208/111 X |
| 3,917,562 | 11/1975 | Hilfman | 208/59 |
| 4,151,070 | 4/1979 | Allan et al. | 208/59 |
| 4,183,801 | 1/1980 | Breuker et al. | 208/59 |
| 4,211,634 | 7/1980 | Bertolacini et al. | 208/59 |
| 4,229,282 | 10/1980 | Peters et al. | 208/59 X |
| 4,370,219 | 1/1983 | Miller | 208/59 |
| 4,372,839 | 2/1983 | Oleck et al. | 208/59 |
| 4,419,218 | 12/1983 | Anjevine et al. | 208/59 |
| 4,419,220 | 12/1983 | LaPierre et al. | 208/111 |
| 4,518,485 | 5/1985 | LaPierre et al. | 208/89 |

FOREIGN PATENT DOCUMENTS 94827  5/1983  European Pat. Off. .

Primary Examiner—Andrew H. Metz
Assistant Examiner—Glenn A. Caldarola
Attorney, Agent, or Firm—Alexander J. McKillop; Michael G. Gilman; Malcolm D. Keen

[57] ABSTRACT

A hydrocracking process for feedstocks containing high boiling, waxy components uses a number of sequential beds of hydrocracking catalyst based on zeolite beta. The proportion of zeolite beta in the catalyst increases in sequence so that the final bed has the highest zeolite concentration. The dewaxing activity of the zeolite beta-containing catalysts is enhanced by the use of sequential beds in this manner. The pour point of the high boiling fraction is reduced, as well as that of the distillate product, permitting part of the high boiling fraction to be included in the distillate product, thereby increasing the useful distillate yield.

20 Claims, 2 Drawing Figures

HYDROCRACKING PROCESS USING ZEOLITE BETA

FIELD OF THE INVENTION

This invention is concerned with a process for catalytically hydrocracking hydrocarbon chargestocks to produce low pour point distillate products of reduced viscosity.

CROSS REFERENCE TO RELATED APPLICATIONS

Co-pending application Ser. No. 379,421, filed May 18, 1982 of R. B. LaPierre and R. D. Partridge relates to a process for the simultaneous catalytic hydrocracking and hydrodewaxing of hydrocarbon oils with zeolite beta.

BACKGROUND OF THE INVENTION

Hydrocracking is a process which has achieved widespread use in petroleum refining for converting various petroleum fractions to lighter and more valuable products, especially gasoline and distillates such as jet fuels, diesel oils and heating oils.

Hydrocracking is generally carried out in conjunction with an initial hydrotreating step in which the heteroatom-containing impurities in the feed are hydrogenated in the presence of a catalyst with acidic and hydrogenation-dehydrogenation functionality without a substantial bulk conversion of the feed. During this step, the heteroatoms, principally nitrogen and sulfur, are converted to ammonia and hydrogen sulfide; these gases may be removed prior to the subsequent hydrocracking step. However, the two stages may be combined in cascade without interstage separation, for example, as in the Unicracking-IHC Process and as described in U.S. Pat. No. 4,435,275. The presence of large quantities of ammonia in the hydrotreating effluent may result in an undesired suppression of cracking activity although this may be compensated by an increase in severity.

In the hydrocracking step, the hydrotreater effluent is contacted with a hydrocracking catalyst which has both an acidic function and a hydrogenation function. In the first step of the reaction, the polycyclic aromatics in the feedstock are hydrogenated, after which cracking takes place together with further hydrogenation. Depending upon the severity of the reaction conditions, the polycyclic aromatics in the feedstock will be hydrocracked down to paraffinic materials or, under less severe conditions, to monocyclic aromatics as well as paraffins and naphthenes.

The acidic function in the catalysts is provided by a carrier such as alumina, silica-alumina, silica-magnesia or a crystalline zeolite such as faujasite, zeolite X, zeolite Y or mordenite. Large pore zeolites have proved to be highly useful catalysts for this purpose because they possess a high degree of intrinsic cracking activity and, for this reason, are capable of producing a good yield of gasoline. They also possess a better resistance to nitrogen and sulfur compounds than the amorphous materials such as alumina and silica-alumina.

The hydrogenation function is provided by a metal or combination of metals. Noble metals of Group VIIIA of the Periodic Table (the Periodic Table used in this specification is the table approved by IUPAC and the U.S. National Bureau of Standards), especially platinum or palladium may be used, as may base metals of Groups IVA, VIA and VIIIA, especially chromium, molybdenum, tungsten, cobalt and nickel. Combinations of metals such as nickel-molybdenum, cobalt-molybdenum, cobalt-nickel, nickel-tungsten, cobalt-nickel-molybdenum and nickel-tungsten-titanium have been shown to be very effective and useful.

A notable advance in hydrocracking is described in co-pending application Ser. No. 379,421 (and its counterpart, EU 94,827). It was found that one particular zeolite, zeolite beta, had a number of highly useful and characteristic properties when used as the basis for a hydrocracking catalyst. First, it shows a significant distillate selectivity; that is, it tends to produce hydrocracked products boiling in the distillate range (about 165°–345° C., about 330°–650° F.) as opposed to conventional hydrocracking catalysts which are naphtha-directing and which tend to produce a gasoline boiling range (about $C_5$ to 165° C., about $C_5$ to 330° F.) product. Although this behavior is shared by other highly siliceous zeolites such as high-silica Y, high silica X and high silica ZSM-20 (as described in EU 98,040), zeolite beta also has the unique ability to hydroisomerize and hydrocrack the paraffinic components of the feed. This is in marked contrast to the behavior of other zeolites such as zeolite Y: if a waxy feedstock is hydrocracked with a conventional large pore catalyst such as zeolite Y, the viscosity of the oil is reduced by cracking most of the 343° C.+ (650° F.+) material into lower boiling products. The remainder of the 345° C.+ material that is not converted, however, contains the majority of the paraffinic components in the feedstock because with these conventional catalysts the aromatics are converted preferentially to the paraffins. The unconverted 345° C.+ material therefore retains a high pour point so that the final, hydrocracked product containing the unconverted paraffins will also have a relatively high pour point. Thus, although the viscosity is reduced, the pour point might still be unacceptable. Even if the conditions are adjusted to give complete or nearly complete conversion, the higher molecular weight hydrocarbons which are present in the feedstock, principally polycyclic aromatics, will be converted to cracking products which include a substantial proportion of straight or slightly branched chain components. If these are of sufficiently high molecular weight themselves (as they often are) they will constitute a waxy component in the product. The final product may therefore be proportionately more waxy than the feedstock (because the non-paraffinic components have been selectively removed by cracking) and, consequently, may have a pour point which is equally unsatisfactory or even more so. Attempts to reduce the molecular weight of these waxy paraffinic products will only serve to produce very light fractions, e.g. propane, so decreasing the desired liquid yield.

Zeolite beta, by contrast, removes the waxy paraffinic components by isomerization and cracking so that a dewaxing effect is achieved simultaneously with the bulk conversion. Consequently, if a gas oil containing paraffins, naphthenes and aromatics is treated under hydrocracking conditions with a zeolite beta catalyst, all three types of hydrocarbon will be converted; other zeolites would selectively hydrocrack the naphthenes and aromatics only, concentrating the paraffins.

The behavior of zeolite beta hydrocracking catalysts is notable not only in that a low pour point distillate product is obtained, but also in that waxy paraffins are removed from the high boiling (345° C.+, about 650° F.+) fraction of the feedstock. This means that the pour point of the high boiling-fraction is also reduced so that it is possible to include a portion of this fraction in the distillate products without violating the specifications—especially the pour point limitations—for the distillate products. In this way, the distillate yield of the process is increased. Generally, it has been found that if the 345°–415° C. (about 650°–775° F.) fraction of the feedstock is dewaxed sufficiently, all of this fraction may be included in the distillate product. Thus, if the dewaxing of this fraction can be maintained at an adequately high level, a substantial improvement in the yield of low pour point distillate may be obtained.

SUMMARY OF THE INVENTION

We have now found that the dewaxing of the 345° C.+ (about 650° F.+) fraction, especially its lighter material (the 345°–415° C., about 650°–775° F. fraction), is improved by using a number of zeolite beta hydrocracking catalysts in sequence with a progressively increasing zeolite concentration. In a typical sequence, the use of two hydrocracking catalysts in sequence with zeolite increasing contents, e.g. of 15 percent and 65 percent, produces a lower pour point for the entire high boiling (345° C.+, about 650° F.+) fraction with a significant increase in the total yield of products usable as distillate, i.e. products in the 165°–415° C. (about 330°–775° F.) boiling range. The improvement in the pour point of the high boiling fraction occurs, however, both in the lighter material or front end (345°–415° C., about 650°–775° F.) as well as in the heavier material or back end (415° C.+; about 775° F.+). Typically, the use of the two catalyst system will reduce the pour point of the front end to about 1°–2° C. (35° F.) as compared to about 15° C. (60° F.) when a single zeolite beta hydrocracking catalyst is used. The pour point of the back end may be reduced to about 27° C. (80° F.) as compared to about 38° C. (100° F.) with the single catalyst. These improvements are attained, moreover, with an initial catalytic activity equivalent to that of the single catalyst and an equivalent total amount of zeolite. The degree of dewaxing achieved is greater, relative to conversion, than with a single catalyst using an equivalent amount of zeolite.

According to the present invention, therefore, a heavy hydrocarbon oil containing components boiling above 345° C. (about 650° F.) is subjected to hydrocracking and dewaxing by passing the oil under hydrocracking conditions in sequence over a plurality of hydrocracking catalysts comprising zeolite beta, the content of zeolite beta in the catalysts being increased in the sequence in which the oil passes over the catalysts.

The hydrocracking is preferably preceded by an initial hydrotreating step and this may use a conventional denitrogenation (hydrotreating) catalyst. Interstage separation is not required although, as described below, it may be employed if desired. The hydrocracking and hydrotreating steps are advantageously carried out at low to moderate pressures, typically 3000 to 10,000 kPa (about 420 to 1435 psig), temperatures are typically in the range of 350° to 450° C. (about 660° to 840° F.).

BRIEF DESCRIPTION OF THE DRAWINGS

In the accompanying drawings.

DETAILED DESCRIPTION

Feedstock

Figure 1:
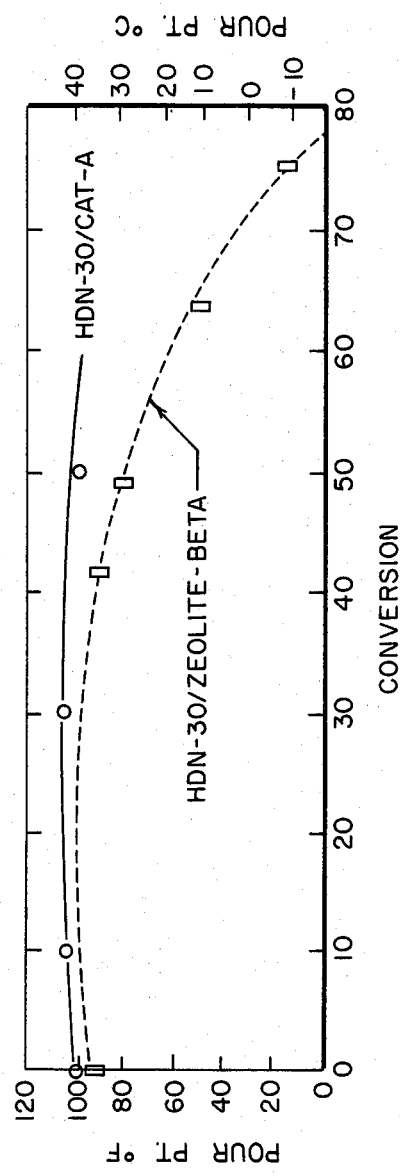
FIGS. 1 and 2 are graphs relating the pour point and paraffin content of the 415° C.+ fraction of the hydrocracked product to the bulk conversion in the hydrocracking process.

The feedstock for the process comprises a heavy oil fraction having an initial boiling point of 200° C. (about 400° F.) and normally of 345° C. (about 650° F.) or higher. Suitable feedstocks of this type include gas oils such as vacuum gas oil, coker gas oil, visbreaker oil, deasphalted oil or catalytic cracker cycle oil. Normally, the feedstock will have an extended boiling range, e.g. 345° C. to 590° C. (about 650° F. to 1100° F.) but may be of more limited ranges with certain feedstocks. The heavy feed will normally contain a substantial amount boiling above 230° C. (450° F.) and will normally have an initial boiling point of at least about 290° C. (about 550° F.), more usually about 345° C. (about 650° F.). Typical boiling ranges will be about 345° to 565° C. (about 650° to 1050° F.) or about 345° to 510° C. (650° to 950° F.) but oils with a narrower boiling range may, of course, be processed, for example, those with a boiling range of about 345° to 455° C. (about 650° to 850° F.). Heavy gas oils are often of this kind as are cycle oils and other non-residual materials. It is possible to co-process materials boiling below 260° C. (about 500° F.) but the degree of conversion will be lower for such components. Feedstocks containing lighter ends of this kind will normally have an initial boiling point above 150° C. (about 300° F.). The nitrogen content is not critical; generally it will be in the range 100 to 1000 ppmw. Likewise, the sulfur content is not critical and typically may range as high as 5 percent by weight. Sulfur contents of 1.0 to 3.0 percent by weight are common.

These heavy oil feeds will comprise high molecular weight long chain paraffins and high molecular weight aromatics with a large proportion of fused ring aromatics. During the processing, the fused ring aromatics and naphthenes are cracked by the acidic catalyst and the paraffinic cracking products, together with paraffinic components of the initial feedstock undergo isomerization to iso-paraffins with some cracking to lower molecular weight materials. The particular characteristic of zeolite beta is that the waxy components (straight chain and slightly branched chain paraffins) are removed from the high boiling fraction so that its pour point (ASTM D-97) is decreased.

The present process is of particular utility with highly paraffinic feeds because, with feeds of this kind, the greatest improvement in pour point may be obtained. However, most feeds will contain a certain content of polycyclic aromatics; it is a notable feature of zeolite beta that it retains its ability to remove the waxy components of the feed even in the presence of substantial amounts of aromatics, e.g. 10 percent or more aromatics. However, the aromatic content of the feed will normally not exceed 50 percent by weight of the feedstock. Typically the aromatic content will be 20–50, more usually about 30, weight percent of the feed.

The feedstock will generally contain relatively large proportions of waxy hydrocarbons in the 345° C.+ (about 650° F.+) fraction; these waxy hydrocarbons may be characterized chemically as straight chain and slightly branched chain paraffins, i.e. n-paraffins and iso-paraffins having short chain branches. The higher molecular weight paraffins will generally be slightly branched chain materials as opposed to being wholly straight chain but because the branchings are relatively short, the linear chain characteristics will predominate, so that the material will be of a waxy nature, contributing to a high pour point.

PROCESS CONDITIONS

General

The feedstock is heated to an elevated temperature and is then passed over the hydrotreating and hydrocracking catalysts in the presence of hydrogen. Because the thermodynamics of hydrogenation become unfavorable at temperatures above about 450° C. (about 850° F.) temperatures above this value will not normally be used. In addition, because the hydrotreating and hydrocracking reactions are net exothermic, the feedstock need not be heated to the temperature desired in the catalyst beds; feed inlet temperatures normally in the range 360° C. to 440° C. (about 675° F. to 825° F.) are typical. At the beginning of the process cycle, the temperature employed will be at the lower end of this range but as the catalyst ages, the temperature may be increased in order to maintain the desired degree of activity.

The heavy oil feedstock is passed over the catalysts in the presence of hydrogen. The space velocity of the oil is usually in the range 0.1 to 10 LHSV, preferably 0.2 to 2.0 LHSV and the hydrogen circulation rate from 250 to 1000 n.1.1$^{-1}$. (about 1400 to 5600 SCF/bbl) and more usually from 300 to 800 (about 1685 to 4500 SCF/bbl). Hydrogen partial pressure is usually at least 75 percent of the total system pressure with reactor inlet pressures normally being in the range of 3000 to 15,000 kPa (about 420 to about 2160 psig), more commonly from 5,000 to 10,000 kPa (about 710 to 1435 psig). Although higher pressure operation, typically up to 30,000 kPa (about 4335 psig) may also be used. The preferred mode of operation is with low to moderate pressures, typically from 5,000 to 15,000 kPa. The process may be operated at low conversion (less than 50 volume percent conversion to 345° C.— (about 650° F.—) products), and when this is done, the pressure may be considerably lower than normal, according to conventional practices: pressures of 5,000 to 7,000 kPa (710 to 1000 psig) are satisfactory, as compared to the pressures of at least 10,500 kPa (about 1500 psig) normally used in commercial hydrocracking processes. However, if desired, low conversion may be obtained by suitable selection of other reaction parameters, e.g., temperature, space velocity, choice of catalyst, even lower pressures may be used. Low pressures are desirable from the point of view of equipment design since less massive and consequently cheaper equipment will be adequate.

Hydrotreating

In the first stage of the process, the feed is passed over a hydrotreating catalyst to convert nitrogen and sulfur containing compounds to gaseous ammonia and hydrogen sulfide. At this stage, hydrocracking is minimized but partial hydrogenation of polycyclic aromatics proceeds, together with a limited degree of conversion to lower boiling (345° C.—, 650° F.—) products. The catalyst used in this stage may be a conventional denitrogenation (hydrotreating) catalyst. Catalysts of this type are relatively immune to poisoning by the nitrogenous and sulfurous impurities in the feedstock and, generally comprise a non-noble metal component supported on an amorphous, porous carrier such as silica, alumina, silica-alumina or silica-magnesia. Because extensive cracking is not desired in this stage of the process, the acidic functionality of the carrier may be relatively low compared to that of the subsequent hydrocracking catalyst. The metal component may be a single metal from Groups VIA and VIIIA of the Periodic Table such as nickel, cobalt, chromium, vanadium, molybdenum, tungsten, or a combination of metals such as nickel-molybdenum, cobalt-nickel-molybdenum, cobalt-molybdenum, nickel-tungsten or nickel-tungsten-titanium. Generally, the metal component will be selected for good hydrogen transfer activity; the catalyst as a whole will have good hydrogen transfer and minimal cracking characteristics. Conventional support materials such as alumina, silica-alumina or various zeolites such as zeolite Y or other large pore zeolites either alone or in combination with binders such as silica, alumina, or silica-alumina, may be used for this catalyst. The catalyst should be pre-sulfided in the normal way in order to convert the metal component (usually impregnated into the carrier and converted to oxide) to the corresponding sulfide.

In the hydrotreating (denitrogenation) stage, the nitrogen and sulfur impurities are converted to ammonia and hydrogen sulfide. At the same time, the polycyclic aromatics are partially hydrogenated to form substituted aromatics which are more readily cracked in the second stage to form alkyl aromatics. The effluent from the first stage may be passed directly to the second or hydrocracking stage without the conventional interstage separation of ammonia or hydrogen sulfide, although hydrogen quenching may be carried out in order to control the effluent temperature and to control the catalyst temperature in the second stage. However, interstage separation of ammonia and hydrogen sulfide may be carried out, particularly with the noble metal hydrocracking catalysts which are more sensitive to the impurities.

Hydrocracking

The effluent from the denitrogenation/desulfurization stage is passed to the hydrocracking step to crack partially hydrogenated aromatics and carry out the other characteristic reactions which take place over the hydrocracking catalyst. The hydrocracking is carried out over a number of sequential beds or zones of the hydrocracking catalyst, with the zeolite content in each zone progressively increasing.

The hydrocracking catalyst comprises zeolite beta at least partly in the hydrogen form as an acidic component, together with a hydrogenation-dehydrogenation component. The hydrogenation-dehydrogenation component is provided by a metal or combination of metals. Noble metals of Group VIIIA, especially platinum, or base metals of Groups IVA, VIA and VIIIA, especially chromium, molybdenum, tungsten, cobalt and nickel, may be used. Base metal combinations such as nickel-molybdenum, cobalt-nickel, nickel-tungsten, cobalt-nickel-molybdenum and nickel-tungsten-titanium are useful.

The content of the metal component will vary according to its catalytic activity. Thus, the highly active noble metals may be used in smaller amounts than the less active base metals. For example, about 0.1 to 1.0 wt. percent platinum will be effective and in a preferred base metal combination, about 1.0 to 7 wt. percent nickel and about 2.1 to about 21 wt. percent tungsten, expressed as metal. The hydrogenation component can be exchanged onto the zeolite, impregnated into it or physically admixed with it. If the metal is to be impregnated into or exchanged onto the zeolite, it may be done, for example, by treating the zeolite with a metal-containing ion. Examples of suitable platinum compounds include chloroplatinic acid, platinum (II) chloride, platinum (II) bromide and various compounds containing the platinum ammine complex. Examples of tungsten compounds include ammonium metatungstate, ammonium paratungstate, and tungsten (VI) chloride. Examples of nickel compounds include nickel (II) nitrate, nickel (II) acetate, and nickel (II) carbonate. Examples of molybdenum compounds include ammonium hepta molybdate, ammonium dimolybdate, and molybdenum (III) bromide. Examples of palladium compounds include palladium (II) chloride and salts of the tetraammine palladium (II) complex. The metal compounds may be either compounds in which the metal is present in the cation of the compound and compounds in which it is present in the anion of the compound. Both types of compounds can be used. Noble metal compounds in which the metal is in the form of a cation or a cationic complex, e.g., $Pt(NH_3)_4Cl_2$ or $Pd(NH_3)_4Cl_2$, or in the form of an anion or anionic complex, e.g., $H_2PtCl_6$, $H_2PdCl_6$ are particularly useful. Cationic forms of other metals are also very useful since they may be exchanged onto the zeolite or impregnated into it.

The acidic component of the hydrocracking catalyst is zeolite beta. Zeolite beta is a crystalline zeolite having a pore size greater than 5 A°. Its composition and X-ray structure are described in U.S. Pat. Nos. 3,308,069 and Re 28,341, to which reference is made for a description of this zeolite, its preparation and properties. Hydrocracking catalysts based on zeolite beta are disclosed in co-pending application Ser. No. 379,421 and EU 94,827, to which reference is made for a description of them.

When it is used in the present catalysts, the zeolite is at least partly in the hydrogen form in order to provide the desired acidic functionality for the cracking reactions which are to take place. It is normally preferred to use the zeolite in a form which has sufficient acidic functionality to give it an alpha value of 1 or more. The alpha value, a measure of zeolite acidic functionality, is described, together with details of its measurement in U.S. Pat. No. 4,016,218 and in J. Catalysis, Vol. VI, pages 278-287 (1966) and reference is made to these for such details. The acidic functionality may be controlled by base exchange of the zeolite, especially with alkali metal cations such as sodium, by steaming or by control of the silica:alumina ratio of the zeolite.

Because the hydrogenation functionality may also be varied by choice of metal and its relative quantity, the balance between the hydrogenation and cracking functions may be adjusted as circumstances require. The ammonia produced in the first stage will, to some degree, tend to reduce the acidic functionality of the hydrocracking catalyst if a cascade process without interstage separation is used but if only a limited degree of conversion is desired, the reduced cracking consequent upon the diminution of acidic functionality may be not only acceptable but also useful.

The preferred forms of zeolite beta for use in the present process are the high silica forms, having a silica:alumina ratio of at least 30:1. It has been found, in fact, that zeolite beta may be prepared with silica:alumina ratios above the 200:1 maximum specified in U.S. Pat. Nos. 3,308,069 and Re. 28,341. Ratios of at least 50:1 and preferably at least 100:1 or even higher, e.g. 250:1, 500:1 may be used.

The silica:alumina ratios referred to in this specification are the structural or framework ratios, as described in U.S. Pat. No. 4,419,220 which also describes the preparation of the highly siliceous forms of zeolite beta. Reference is made to U.S. Pat. No. 4,419,220 for a description of these forms of the zeolite and their preparation and a discussion of silica:alumina structural ratios.

Prior to use the zeolite should be dehydrated at least partially. This can be done by heating to a temperature in the range of 200° C. to 600° C. in air or an inert atmosphere such as nitrogen for 1 to 48 hours. Dehydration can also be performed at lower temperatures merely by using a vacuum, but a longer time is required to obtain a sufficient amount of dehydration.

In order to obtain the increasing zeolite loading across the sequence of hydrocracking beds, the zeolite will be incorporated in another material resistant to the temperature and other conditions employed in the process. Such matrix materials include synthetic and naturally occurring substances such as inorganic materials, e.g. clay, silica, alumina, and metal oxides. The latter may be either naturally occurring or in the form of gelantinous precipitates or gels including mixtures of silica and metal oxides. Naturally occurring clays which can be composited with the modified zeolite include those of the montmorillonite and kaolin families, which families include the sub-bentonites and the kaolins commonly known as Dixie, McNamee-Georgia and Florida clays or others in which the main mineral constituent is halloysite, keolinite, dickite, nacrite or anauxite. Such clays can be used in the raw state as originally mined or initially subjected to calcination, acid treatment or chemical modification.

As an alternative to the foregoing materials, the zeolite may be composited with a porous matrix material, such as silica-alumina, silica-magnesia, silica-zirconia, silica-thoria, silica-berylia, silica-titania as well as ternary compositions, such as silica-alumina-thoria, silica-alumina-zirconia, silica-alumina-magnesia and silica-magnesia-zirconia. The matrix may be added to the zeolite in the form of a cogel. Although they are not required to do so, the matrix materials may themselves possess catalytic properties, generally of an acidic nature. If an acidic binder such as alumina is used, the relatively greater content of this material in the initial zone of the hydrocracking step may be effective to increase the non-selective hydrocracking in this zone so that an increased paraffin concentration is obtained and this may further enhance the dewaxing effect of the zeolite beta.

The zeolite may be composited with the binder in the conventional way, for example, by mixing in the desired ratio and then extruding under pressure.

The amount of zeolite in the hydrocracking catalysts may range from a very low amount, for example, about 5% by weight to a high amount, for example, 100% by weight of the total non-metal components. However, because it will normally be desirable to use at least some binder in the catalyst, the amount of zeolite will generally be in the range of 5-90% by weight, more usually in the range 10-80% by weight, with the zeolite content increasing in successive beds. In a multiple bed sequence, the content of zeolite in the first bed will generally be in the range 5-40% by weight, more typically 5-25% by weight, with progressive increases in the zeolite loading to the final bed in the sequence with 50-90% by weight, usually 60-80% by weight of the zeolite beta. Although, in principle, a continuous increase in the zeolite content of the catalyst could be provided, practical considerations dictate the use of a number of beds with the zeolite content increasing in discrete steps. For similar practical reasons, the number of beds will generally be limited to two or three although in principle, four, five or even more beds could be provided in the sequence. In a two-bed system for the hydrocracking catalyst, the first bed will typically have a catalyst with a zeolite content of 5-40, preferably 10 to 25, percent by weight zeolite beta with the second bed containing 40-90, preferably 50-80, percent by weight of the zeolite. In a three-bed system, the zeolite contents would typically be

|  | Broad | Preferred |
| --- | --- | --- |
| First bed | 5-35 | 10-25 |
| Second bed | 25-75 | 30-60 |
| Third bed | 65-90 | 60-80 |

The sequential beds may be provided in separate reactor vessels or may simply be loaded on top of one another in a single vessel. In a cascade operation (no interchange separation between hydrotreating and hydrocracking) the hydrotreating and hydrocracking catalysts may simply be loaded on top of one another in the appropriate sequence.

The catalyst may be treated by conventional pre-sulfiding treatments, e.g. by heating in the presence of hydrogen sulfide, to convert oxide forms of the metals such as CoO or NiO to their corresponding sulfides.

Specific Process Considerations

The relative proportions of the hydrocracking and the hydrotreating catalysts may be varied according to the feedstock in order to convert the nitrogen in the feedstock to ammonia before the charge passes to the hydrocracking step; the object is to reduce the nitrogen level of the charge to a point where the desired degree of conversion by the hydrocracking catalyst is attained with the optimum combination of space velocity and reaction temperature. The greater the amount of nitrogen in the feed, the greater then will be the proportion of hydrotreating (denitrogenation) catalyst relative to the hydrocracking catalyst. If the amount of nitrogen in the feed is low, the catalyst ratio may be as low as 10:90 (by volume, denitrogenation:hydrocracking). In general, however, ratios between 25:75 to 75:25 will be used. With many stocks, an approximately equal volume ratio will be suitable, e.g. 40:60, 50:50 or 60:40.

In addition to the denitrogenation function of the hydrotreating catalyst another and at least as important function is desulfurization since the sulfur content of the distillate product is one of the most important product specifications which have to be observed. The low sulfur products are more valuable and are often required by environmental regulation; the degree of desulfurization achieved is therefore of considerable significance. The degree of desulfurization obtained will be dependent in part upon the ratio of the hydrotreating catalyst to the hydrocracking catalyst and appropriate choice of the ratio will be an important factor in the selection of process conditions for a given feedstock and product specification. The degree of desulfurization will increase as the proportion of the hydrotreating catalyst increases. The hydrocracking catalyst is substantially poorer for desulfurization than the hydrotreating catalyst, but the lowest sulfur contents consistent with the required conversion may be obtained with an appropriate selection of the catalyst ratio. Another function of the hydrotreating catalyst is to aid in the saturation of polycyclic coke precursors and this, in turn, helps in extending the life of the hydrocracking catalyst.

The degree of desulfurization is, of course, dependent upon factors other than the choice of catalyst ratio. The sulfur content of the distillate product may be dependent in part upon the conversion and regulation of the conversion will therefore enable the sulfur content of the distillate to be further controlled: greater desulfurization is obtained at higher conversions and therefore the lowest sulfur content distillates will be obtained near the desired maximum conversion. Alternatively, it may be possible to increase the degree of desulfurization at a given conversion by raising the temperature of the hydrotreating bed while holding the temperature of the hydrocracking bed constant. This may be accomplished by appropriate use of hydrogen quenching.

In low to moderate pressure operation (below 10,000 kPa) the overall conversion is preferably maintained at a low level, less than 50 volume percent to lower boiling products, usually 345° C.− (650° F.−) products from the heavy oil feedstocks used. The conversion may, of course, be maintained at even lower levels, e.g. 30 or 40 percent by volume. The degree of cracking to gas ($C_{4-}$) which occurs at these low conversion figures is correspondingly low and so is the conversion to naphtha (200° C.−, 400° F.−); the distillate selectivity of the process is accordingly high and overcracking to lighter and less desired products is minimized. It is believed that this effect is procured, in part, by the effect of the ammonia carried over from the first stage. Control of conversion may be effected by conventional expedients such as control of temperature, pressure, space velocity and other reaction parameters.

The presence of nitrogen and sulfur compounds in the second stage feed does not adversely affect catalyst aging in the absence of interstage separation at low to moderate pressures provided that sufficient denitrogenation catalyst is employed. Catalyst life before regeneration in this process may typically be one year or even longer. It is possible to use Pt/beta as the hydrocracking catalyst without interstage separation of heteroatoms. As is well known, platinum-containing catalysts are particularly prone to poisoning and it is therefore surprising that the Pt/beta functions as it does; in fact, compared to single stage hydrocracking without hydrotreating, less Pt/beta is required, other conditions being equal. Furthermore, the Pt/beta catalyst has been shown to be superior in hydroisomerization of waxy paraffins, as compared to NiW/beta, although its hydrocracking activity is lower than that of NiW/beta either in the cascade (no interstage separation) or two stage (interstage separation) modes. Because of this, the pour point obtained with the Pt/beta hydrocracking catalyst will be lower, e.g. by about 10° C. than with the NiW/beta. The distillate selectivity of the Pt/beta catalyst may also be higher than that of the NiW/beta version.

Compared to single stage hydrocracking, i.e., hydrocracking with a single catalyst, two-stage hydrotreating/hydrocracking (with interstage separation) achieves greater activity, permitting lower temperatures to be used, while using less zeolite, typically about 30 percent less. An improvement in distillate selectivity may also result. An additional benefit is that desulfurization and paraffin isomerization selectivity are also improved. Cascade processing without interstage separation provides product yields and qualities similar to those of separate two-stage processing without any major loss of conversion activity, although some loss of isomerization selectivity may ensue. However, any such loss may be compensated for by using a Pt/beta catalyst instead of a base metal catalyst, e.g. NiW/beta.

Figure 2:
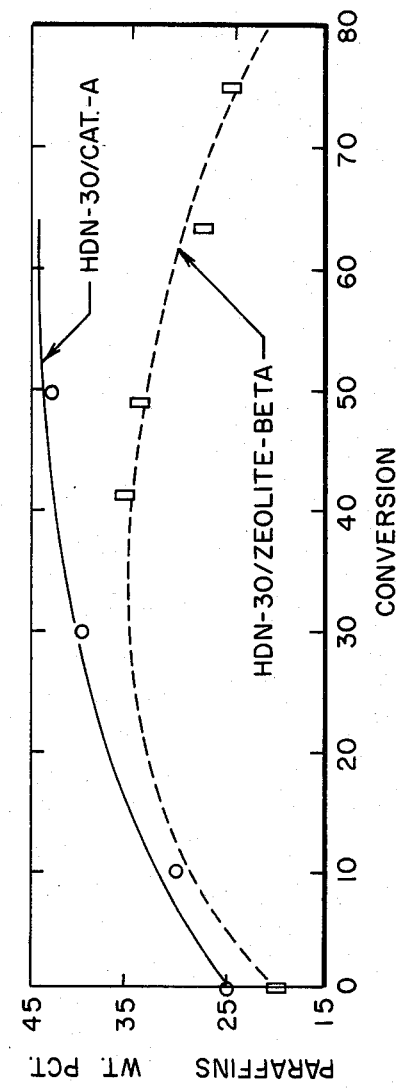

The improved dewaxing and distillate yield with the zeolite gradient system result from the unique role of zeolite Beta in hydrocracking. The process involves two parallel reactions: non-selective hydrocracking and selective paraffin cracking and isomerization. The non-selective hydrocracking will result in an increased paraffin concentration in the unconverted fraction (e.g., the 345°–415° C., 650°–775° F. fraction). The selective paraffin cracking and isomerization is primarily responsible for the pour point reduction. To demonstrate these two reactions the pour point and paraffin concentration in the 415° C. (775° F.+) hydrocracked products are shown as functions of the 345° C.+ (650° F.+) conversion (based on the two-catalyst system) in FIGS. 1 and 2. The (415° C.) 775° F.+ pour is reduced significantly only at conversions greater than 40%. Meanwhile, the paraffin content in the 415° C.+ (775° F.+) fraction shows a maximum around 35% conversion. For comparison, data obtained from a conventional hydrotreating/hydrocracking system using a conventional, commercially available hydrocracking catalyst (Cat-A) are also shown in FIGS. 1 and 2. Since the commercial hydrocracking catalyst has no dewaxing capability, the 415° C. (775° F.+) paraffin concentration increases as conversion progresses. Consequently, the 415° C.+ (775° F.+) paraffin concentration increases a conversion progresses. Consequently, the dewaxing of the 415° C.+ (775° F.+) fraction will be more efficient when the dewaxing zeolite (zeolite Beta) concentration is proportional to the non-selective hydrocracking if two reactions are carried out in separate reactors. For parallel reactions as observed for zeolite Beta catalyst systems, the three-catalyst system will enhance 415° C.+ (775° F.+) dewaxing driving force because both paraffin content in the 415° C.+ (775° F.+) fraction and zeolite Beta concentration on the catalyst are high in the second part of the reactor. Similar conclusions are applicable to the dewaxing improvement of the 650°–775° F. fraction.

EXAMPLES 1 AND 2

A vacuum gas oil having the properties set out in Table 1 below was subjected to a cascade hydrotreating/hydrocracking (no interstage separation) process, using a commercially available hydrotreating catalyst (American Cyanamid HDN-30). The hydrocracking was carried out using a single bed of a Ni-W zeolite beta (4% Ni 10%W) hydrocracking catalyst (Ex. 1) and two bed Ni-W zeolite beta (4% Ni, 10%W) hydrocracking catalyst (Ex. 2) at 5480 kPa (780 psig) at 0.5 LHSV, $H_2$ circulation rate of 712 n.l.l.$^{-1}$ (4000 SCF/bbl). The reaction temperatures were varied to obtained data at different conversions. The conversion is defined as the weight percentage of conversion of the 345° C.+ (650° F.+) fraction in the feed. Thus, the 345° C.+ (650° F.+) conversion is defined as:

$$\text{Conversion (wt. \%)} = 100 \times \frac{(\text{Wt. \% 345° C.} + \text{feed} - \text{Wt. \% 345° C.} + \text{product})}{\text{Wt. \% 345° C.} + \text{feed}}$$

If the feed contains 345° C.− (650° F.−) components, the conversion should be normalized to a 345° C.+ (650° F.+) feed. Thus, for a feed such as the VGO used here, containing 7 wt. % 345° C.− (650° F.−) distillate (see Table 1 below), the conversion is:

$$\text{Conversion (wt. \%)} = 100 \times \frac{(93.0 - \text{Wt. \% 345° C.} - \text{product})}{93.0}$$

The results obtained are shown in Table 2 below.

TABLE 1

| VGO Properties | |
|---|---|
| Gravity, °API | 21.2 |
| Hydrogen, Wt % | 12.26 |
| Sulfur, Wt % | 2.49 |
| Nitrogen, ppm | 800 |
| OCR, Wt % | 0.06 |
| Pour Point, °C. (°F.) | 32 (90) |
| KV @ 100° C., cs | 7.162 |
| Distillation (D2887), °C. (°F.) | |
| IBP | 292 (557) |
| 5% | 331 (628) |
| 10 | 351 (664) |
| 30 | 401 (754) |
| 50 | 438 (821) |
| 70 | 476 (889) |
| 90 | 528 (983) |
| 95 | 547 (1017) |
| EP | 589 (1093) |

TABLE 2

| | Hydrocracking VGO | | | | |
|---|---|---|---|---|---|
| | Ex. 1 HDN-30/50% Beta | | Ex. 2 HDN-30/15% Beta/65% Beta | | |
| Catalyst | | | | | |
| Volume, cc | 33/67 | | 33/30/47 | | |
| Total Zeolite Beta, g. | 20.2 | | 20.1 | | |
| | Conversion, % | | | | |
| | 20 | 35 | 20 | 35 | 50 |
| Pour Point, °C. (°F.) | | | | | |
| 227–345° C. (440–650° F.) | — | −23 (−10) | −26 (−15) | −23 (−10) | −40 (−40) |
| 345–415° C. (650–775° F.) | — | 15 (60) | 7 (45) | 2 (35) | −1 (30) |
| 415° C.+ (775° F.+) | — | 38 (100) | 27 (80) | 27 (80) | −15 (5) |
| Yields, Wt % | | | | | |
| $C_1$-$C_4$ | 2.0 | 2.5 | 0.8 | 1.3 | 1.8 |
| $C_5$-165° C. ($C_5$-330° F.) | 6.4 | 9.2 | 2.4 | 9.3 | 18.8 |

TABLE 2-continued

| Hydrocracking VGO | | | | | | | | |
|---|---|---|---|---|---|---|---|---|
| 165–345° C. (330–650° F.) | 15.7 | 25.3 | } 49.0 | 20.9 | 27.4 | } 52.4 | 31.5 | } 50.7 |
| 345–415° C. (650–775° F.) | 22.1 | 23.7 | | 29.3 | 25.0 | | 19.2 | |
| 415°C.+ (775° F.+) | 52.3 | 36.8 | | 45.1 | 35.5 | | 27.3 | |

The results reported in Table 2 show that, at equivalent conversion, although both systems have an equivalent amount of zeolite beta, the three bed system of Example 2 reduces the pour point of the 345°–415° C. (650°–775° F.) fraction much more than the two bed system of Example 1 (Pour Point of 2° C. at 35% conversion, compared to 15° C.). Similar results are observed for pour point reduction of the 415° C.+ fraction. More signifcantly, the yield of 165°–415° C. (330°–775° F.) distillate is also increased from 49 to 52.4 weight percent. It should be noted here, however, that the useful distillate yield is increased much more because the high pour point of the 345°–415° C. fraction obtained from the two bed system would preclude the addition of this fraction to the total distillate pool.

We claim:

1. A process for the hydrocracking and dewaxing of a petroleum fraction comprising waxy components boiling above 345° C., which comprises passing the fraction over a hydrocracking catalyst comprising zeolite beta and a matrix material in the presence of hydrogen and under hydrocracking conditions, the proportion of zeolite beta in the hydrocracking catalyst increasing in the direction in which the fraction is passed.

2. A process according to claim 1 in which the hydrocracking catalyst comprises zeolite beta, a metal component of a metal of Groups IVA, VA, VIA, or VIIIA of the Periodic Table and a binder.

3. A process according to claim 2 in which the binder comprises silica, alumina, silica-alumina, or a clay.

4. A process according to claim 1 in which the proportion of zeolite beta in the catalyst increases in the direction in which the fraction passes from an initial low value in the range from 5 to 35 weight percent zeolite beta to a final high value in the range 50 to 90 weight percent zeolite beta.

5. A process according to claim 1 in which the proportion of zeolite beta in the catalyst increases in the direction in which the fraction passes from an initial low value in the range from 10 to 25 weight percent zeolite beta to a final high value in the range 60 to 80 weight percent zeolite beta.

6. A method of hydrocracking and dewaxing a petroleum fraction feed comprising waxy components boiling above 345° C. by:
  (i) hydrotreating the feed
  (ii) passing the hydrotreated feed under hydrocracking donditions in the presence of hydrogen in contact with a plurality of beds, in sequence, of hydrocracking catalysts comprising zeolite beta, a matrix material and a hydrogenation-dehydrogenation component, the proportion of zeolite beta in the hydrocracking catalysts increasing in successive beds.

7. A method according to claim 6 in which the hydrotreated fraction is passed over two beds of hydrocracking catalysts.

8. A method according to claim 7 in which the first bed of hydrocracking catalyst in the sequence comprises 5 to 50 weight percent zeolite beta.

9. A method according to claim 7 in which the first bed of hydrocracking catalyst in the sequence comprises 10 to 25 weight percent zeolite beta.

10. A method according to claim 7 in which the second bed of hydrocracking catalyst in the sequence comprises 50 to 90 weight percent zeolite beta.

11. A method according to claim 7 in which the second bed of hydrocracking catalyst in the sequence comprises 60 to 80 weight percent zeolite beta.

12. A method according to claim 6 in which each hydrocracking catalyst comprises zeolite beta, a binder and a metal hydrogenation-dehydrogenation component.

13. A method according to claim 12 in which the metal component comprises a base metal of Groups VA, VIA or VIIIA of the Periodic Table.

14. A method according to claim 12 in which the metal component comprises platinum or palladium.

15. A method according to claim 12 in which the binder comprises alumina, silica, silica-alumina or a clay.

16. A method according to claim 6 in which the feed is hydrotreated by passing the feed in contact with a hydrotreating catalyst in the presence of hydrogen under hydrotreating conditions, after which the hydrotreated feed is passed directly to the first bed of hydrocracking catalyst without interstage separation of other hydrotreating products.

17. A process according to claim 6 in which the feed is passed over the hydrocracking catalysts at a pressure not more than 10,000 kPa.

18. A process according to claim 6 in which the feed is passed over the hydrocracking catalysts at a pressure not more than 7,000 kPa.

19. A process according to claim 16 in which the feed is passed over the hydrocracking at a pressure not more than 10,000 kPa.

20. A process according to claim 16 in which the feed is passed over the hydrocracking catalysts at a pressure not more than 7,000 kPa.

* * * * *